Dec. 18, 1956     C. J. THATCHER     2,774,194
ULTRASONIC TOOLS
Filed Nov. 8, 1954     3 Sheets-Sheet 1
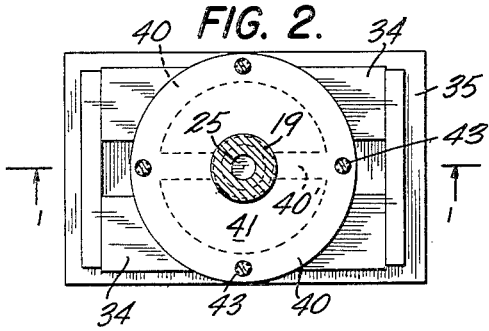
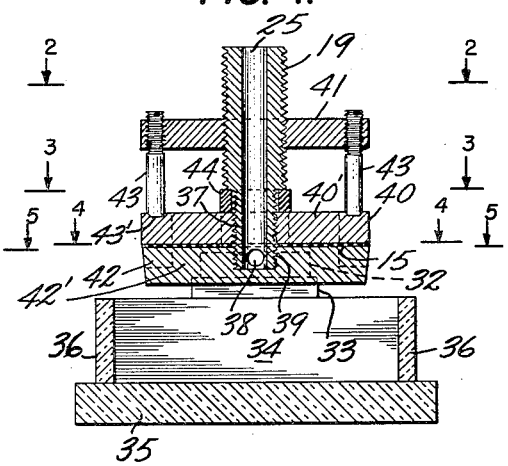
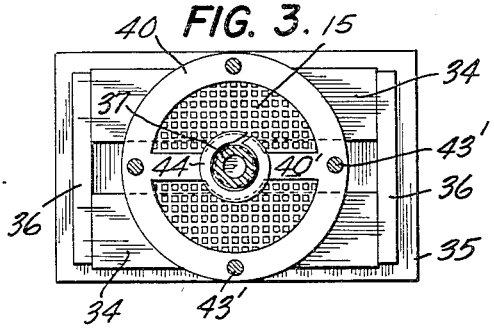
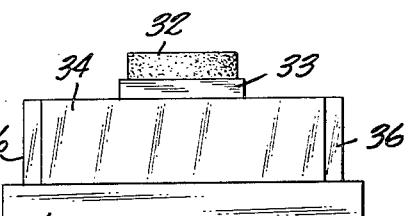
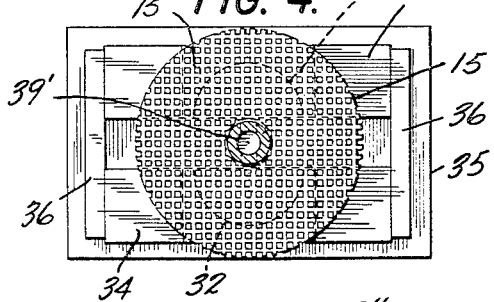
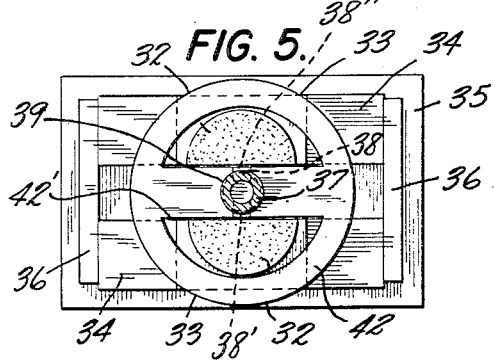
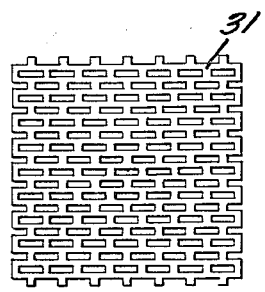
INVENTOR
CHAS. J. THATCHER
BY
Moses, Nolte, Crews & Berry
ATTORNEYS Dec. 18, 1956   C. J. THATCHER   2,774,194
ULTRASONIC TOOLS
Filed Nov. 8, 1954   3 Sheets-Sheet 2
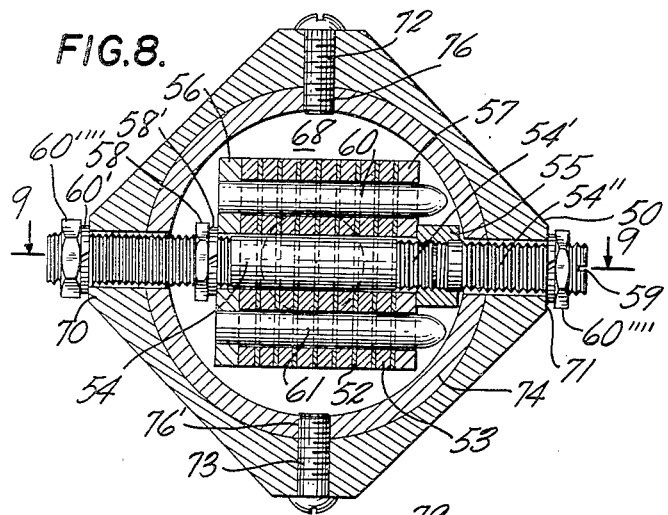
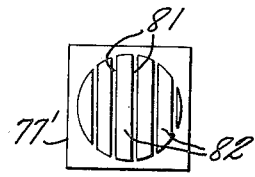
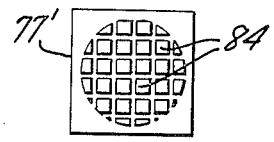
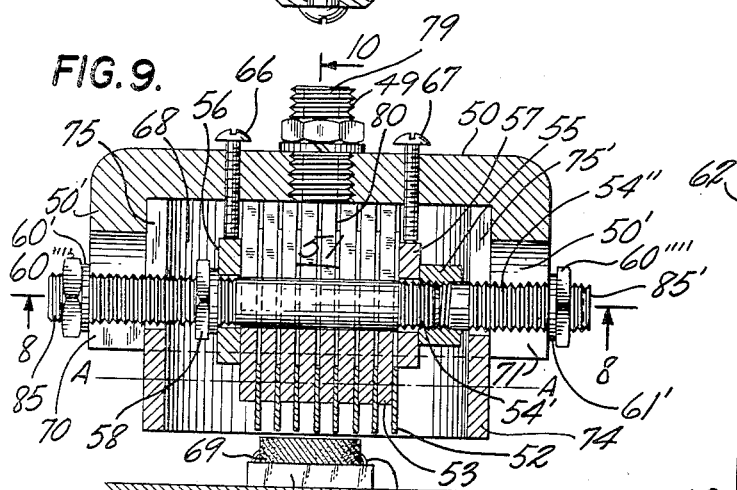
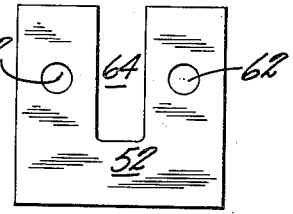
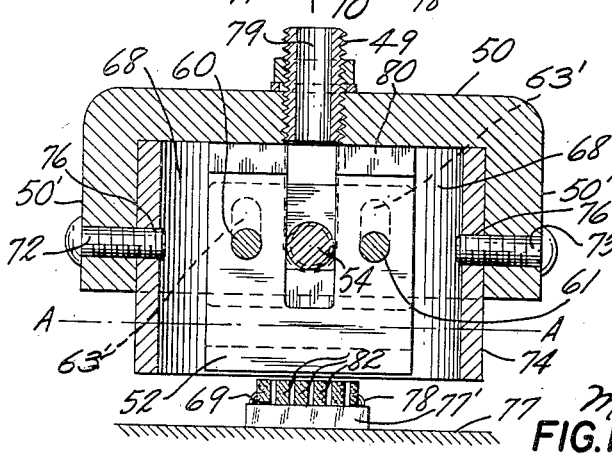
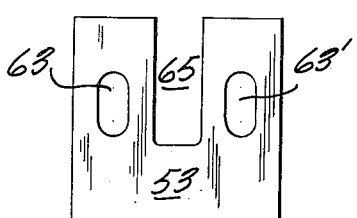
INVENTOR.
CHARLES J. THATCHER
BY
Moses, Nolte, Cravers & Berry
ATTORNEYS

United States Patent Office 2,774,194
Patented Dec. 18, 1956

2,774,194

ULTRASONIC TOOLS

Charles J. Thatcher, New York, N. Y.

Application November 8, 1954, Serial No. 467,443

8 Claims. (Cl. 51—59)

This invention relates to means and a method for cutting or shaping, by high frequency vibratory abrasion, of hard, brittle semi-conductors such as germanium or its alloys or silicon into the small pellets or blocks now used in the manufacture of transistors.

A most important object of my invention is therefore to provide an ultrasonic cutting tool particularly adapted to incise suitably and uniformly dimensioned, multiple, but minute blocks of germanium metal or alloys, or of silicon from slices thereof, or other semi-conductors so as to permit the manufacture of junction, point-contact, surface-barrier, or any other form of transistors, expeditiously and at low operating cost, without the use of diamond saws, which are expected to be in short supply, largely because of the magnitude of the suddenly developed Government transistor production program, or in case of emergency. And it will be shown also that very important economies in costs of materials and operation, as well as a very large increase in speed of production of transistors, attaining mass production, will be attained by use of my transistor cutting tool.

A further object of my invention is so to design the cutting tools and holders therefor that fracturing of the tool and/or of transistor blocks will not occur during use.

Still another object is to provide means whereby the tools may be quickly and readily secured and firmly attached to and readily detached from the tool holder, by mechanical, threaded means, rather than by the time-consuming means now employed, e. g., those involving soldering with hard solder.

An outstanding objective of my invention is to facilitate rapid mass-production of transistors, economically, by providing a tool for ultrasonic cutting thereof which comprises multiple die-face patterns identical in all respects, so that commercial mass production of uniform blocks or pellets from which finished transistors are to be made, may be feasible, that is so that scores of such pellets may be manufactured by one or several mechanical operations, not manually and singly, and one by one as heretofore. Pellets cut with diamond saws vary in size so much, due to saw wear, that there are many "rejects" which my invention eliminates.

It is an important objective of my invention to construct and provide such a tool, for the specific purpose, from low cost, readily obtainable materials, so that any parts which, as the inevitable result of use, are worn or broken, may easily and cheaply be replaced; and so to arrange these parts that initial construction of the tool and/or its subsequent reassembly is easily accomplished.

Furthermore, another important objective of my invention is to provide ready and inexpensive means and method whereby the cutting faces and the multiple cutting ends of the tool can be easily changed in over-all shape and dimensions, or restored to those required, so as to provide multiple, identically dimensioned pellets of any desired dimensions. Irregularities in size and shape of transistor blocks has been one of the deterrent factors in their mass-production and widespread use. One major cause of such irregularities has been the ever-changing thickness of diamond saws resulting from rapid wear during use.

The objects of my invention also include the provision of means and a method whereby the abrasive slurries employed in such cutting operations will be adequately and copiously supplied, during use, to the peripheral sides and also to the ends of the cutting tools, and even to tools having multiple such ends, and so that all surfaces thereof of all such cutting ends are constantly bathed in the liquid; and so as to insure that a stream of the liquid slurry flows over all such surfaces with sufficient velocity to insure a constant supply of activated slurry of abrasive particles to all portions of the work surface; and a constant sweeping away therefrom of the detritus of abraded work particles.

To this end it is an object of my invention to provide a suitable channel or channels in or about the surfaces of vibratory abrasive tools, and even of their cutting end surfaces, and so designed and arranged that said channels cannot become closed or clogged, either with solid cores or with packed detritus during use of the tools, but will, rather, remain open for unimpeded flow of the liquid slurry to and from even multiple tool ends, and so that it can thus exert its maximum cutting action and also have an efficient scavenging effect at all times and over all working surfaces of the tool ends.

A further object is to provide means securely to attach the cutting tool to the transducer or to an intervening tool holder by means which will not involve heating of the materials of the tool or holder to sufficiently high temperatures, as to effect hard soldering, or subject them thereby to such abrupt temperature changes as to embrittle and/or harden the metals thereof—such as those which have heretofore resulted from exposure to blow torch flames during hard soldering, without subsequent annealing.

It is, accordingly, a general objective of this invention to provide practical means and a method whereby to overcome the errors in technique of operation and design of ultrasonic cutting tools which, heretofore, have handicapped commercially extensive use of high frequency vibratory abrasion, particularly in the manufacture of transistors. Use of the disclosures and improvements hereof in conjunction with those disclosed in my co-pending U. S. applications, i. e., those of C. J. Thatcher, Serial Nos. 321,579 and 371,408, now U. S. Patents #2,736,-144 and #2,736,148, respectively, for improvements in Machining by High Frequency Vibratory Abrasion and for Activation of Slurries Therefor, will be found to constitute important advances in these arts.

Embodiments of my invention capable of accomplishing its objective and providing the advantages herein stated, and others which will appear, are described in the following specification, which may be better understood by reference to the following drawings, in which:

Figure 1 illustrates one form of applicant's tool for cutting transistor blocks by ultrasonic cutting from germanium slices, shown in longitudinal sectional view taken on line 1—1 of Figure 2, and with the base or means for mounting the slices during the cutting operation;

Figures 2 to 5 show transverse, horizontal sectional views of the tool of Figure 1 taken along lines 2—2, 3—3, 4—4, and 5—5 of Figure 1 looking in the direction of the arrows;

Figure 6 is a vertical front view of a germanium slice and its mounting base;

Figure 7 illustrates a top view of an alternative form of the perforated metal sheets which are used in the cutting tool of Figures 1 to 4;

Figure 8 illustrates another form of applicant's invention and of his ultrasonic tool for cutting and shaping transistor pellets or blocks, shown in transverse sectional view on line 8—8 of Figure 9 looking upwardly in the direction of the arrows;

Figure 9 shows this form of tool in longitudinal sectional view taken on line 9—9 of Figure 8, and adds a sectional view of a slice of the transistor material mounted in position for cutting;

Figure 10 shows this tool in longitudinal sectional view taken on line 10—10 of Figure 9 looking in the direction of the arrows, and includes a section through a slice of the transistor material;

Figure 11 shows a front elevational view of one of the formed pieces of sheet metal which constitute the cutting blades and provide the cutting edges of the tool;

Figure 12 shows a front view of one of the formed pieces of sheet metal or other suitable material which constitute the spacers between the cutting blades and thus determine the shape and dimensions of the transistor pellets cut by this form of tool;

Figure 13 shows a top view of the appearance of a slice of the semi-conducting material after it is first cut into parallel strips by this form of tool;

Figure 15:
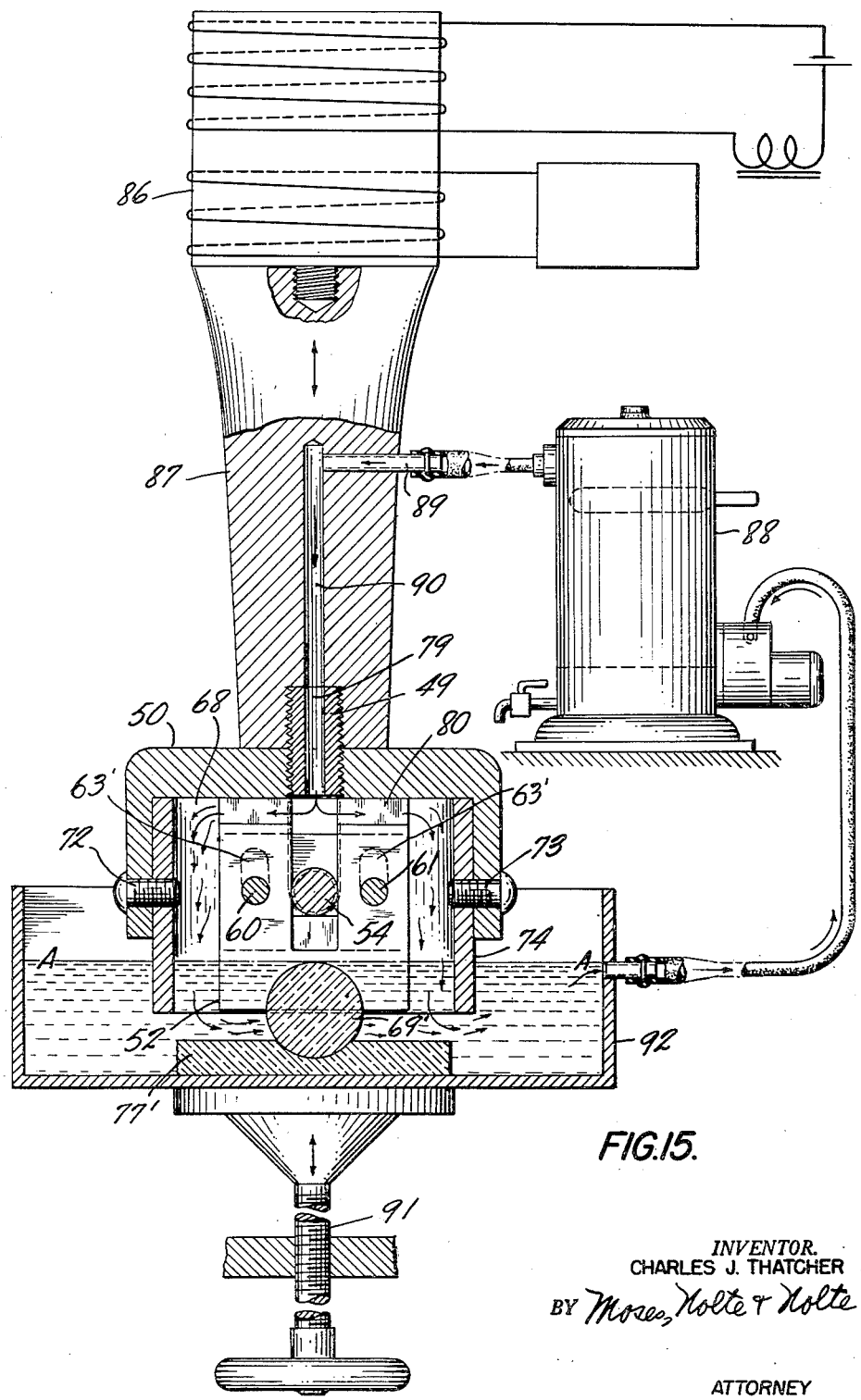

Figure 14 shows a top view of the completely incised and diced semi-conductor material with the transistor blocks still mounted and adhering to the base plate, after a second incision by the cutting tool while they are in the relative positions shown in Figure 10, so as to give cuts transverse of the strips of Figure 13; and Figure 15 shows a longitudinal, sectional view of the tool as illustrated in Fig. 10, connected, in operative assembly, with a coupled transducer, tool holder, workpiece and its mounting in a tray, and with means to circulate liquid slurry around the cutting edges of the tool, partly in sectional and partly front elevation.

The tool of my invention illustrated by Figs. 1 to 10 is designed for a special purpose, viz., to incise minute, properly dimensioned multiple blocks of germanium metal or alloys and/or of silicon in the commercial mass production of transistors from germanium slices. Applicant is advised that the total eventual demand for these solid-state electronic devices is expected to be as great as that for thermionic vacuum tubes heretofore used, which, it has been estimated, had a total production in this country of about 35 million per month in 1952. One plant, alone, the Western Electric plant at Laureldale, Pennsylvania, financed by the U. S. Government, was designed to produce about one million transistors and related devices per month.

Heretofore, applicant understands, single or multicrystal ingots, and slices cut therefrom, have been diced with diamond saws into minute slabs, of suitable dimensions, originally say about $\frac{1}{32}"$ square and $\frac{1}{8}"$ long. This has so greatly and suddenly increased the demand for diamond saws that in 1952 when the combined total production of transistors was far below 50,000 units per month one of the largest manufacturers of diamond saws found itself booked up with orders for diamond wheels which would take about two and one-half years to fill—if it received no more orders. With the growing, greatly increasing demand for diamond saws for dicing germanium slices into pellets from which to make transistors, this manufacturer expected to get further and further behind in filling its orders. It is understood that the U. S. Government, consequently, has been and is seeking means to supplant the use of industrial diamonds for all purposes. They will be available in limited supply, of course, for some years to come; but, even in 1952, before the transistor production program began to approach full swing, diamond wheel manufacturers could not import enough bort (industrial diamonds) for the then current needs.

Applicant has accordingly devised the tool of Figs. 1 to 10 hereof to supplant the use of industrial diamonds and diamond saws for the mass production of transistors.

It has been shown by tests that the transistors cutting tool of this invention will incise, in one cutting operation completed in several seconds, about 80 perfectly formed point-contact transistor slabs each $\frac{3}{64}" \times \frac{3}{64}" \times \frac{1}{100}"$ from germanium slices $\frac{1}{100}"$ thick and $\frac{5}{8}"$ in diameter, when preformed perforated metal sheets like that shown at 15 in Figs. 1, 3 and 4 are used to provide the die pattern. At least twice that number or 160 of .005 inch thick junction transistors can be made in two cuts with the tool of Figs. 8 to 10, and even with one cut using a modification thereof.

Using a diamond saw to cut germanium slices to make transistor slabs of the same dimension would require over 20 saw cuts, each cut requiring precise positioning and manual handling and positioning of individual slices. Since applicant's ultrasonic transistor cutting tool produces 80 or more completed germanium pellets of this or any similar size in one operation lasting only a few seconds, from .001" thick germanium slices $\frac{5}{8}"$ in diameter it is obvious this invention will materially increase the speed and lessen the cost of transistor manufacture. If larger slices, e. g., those 1" in diameter, are incised by use of the tool of this invention its advantage will be of even greater significance, for about 250 blocks of the sizes before specified can then be cut with the tool of Figs. 1 to 5 or 8 to 10, in an operation requiring but a few minutes to complete.

One form of the means herein disclosed for this advance in the art comprises the tool depicted, in various views, in Figures 1 to 5, and a means for securely mounting a germanium or equivalent slice upon a base depicted in Figures 1, 5 and 6. As there shown, slice 32, having been severed into two approximately equal semi-circular parts, is first cemented to two small rectangular pieces 33 of glass or other suitable expendable material. Canada balsam, de Khotinsky, shellac or other suitable cementitious material can be used for this purpose. The straight edge of each semicircular piece of the slice is mounted on plate 33 so that it is in alignment with one straight edge of 33. The two plates 33, each carrying a half slice section, are then secured each to a glass block 34, each of which may have approximately the dimensions shown in the patent drawings. Plates 33 are cemented each to a block 34 so that the straight line of semislice 32 is in alignment with one of the longer upright sides of a block 34—as shown in Figure 5.

Blocks 34, each carrying a plate 33 and a semi-slice 32, are then positioned and cemented to a base plate 35 which may also be of glass, the two being spaced apart—as shown particularly in Figure 5—just far enough to permit the entry of bar 42' (see Figures 1 and 5) between the adjacent upright sides of the two blocks 34, after 42' has cleared the straight edges of half slices 32 during the descent of the cutting tool onto the work piece. This spacing of the two blocks 34, 34 is secured and maintained by cementing a third pair of plates 36, one to each adjacent upright end of a block 34 while the two are movably positioned (before the cement has set) on plate 35, with the bar 42' inserted between the blocks 34 and in close proximity to their longer upright sides—all as illustrated in Figure 5.

The mounting procedure just described produces an assembled work-piece unit shown in front elevation in Figures 1 and 6 and in horizontal top view in Figure 5. This mounting of the work-piece is then adjustably affixed in a dish-like pan similar to that shown at 92 in Fig. 15, the sides of which extend upwardly sufficiently to contain liquid at a level above the top of slice 32; and this pan is affixed to the work table (not shown) of an ultrasonic cutting machine of the type shown in U. S. patents to Rosenthal No. 2,452,211, Griss No. 2,504,831 or Balamuth No. 2,580,831, or in the co-pending patent application of C. J. Thatcher, the applicant hereof, Serial No. 321,579, now U. S. Patent #2,736,144.

This form of the transistor cutting tool of this invention is best shown in its entirety in Figure 1 in vertical cross-section on its medial line 1—1 of Figure 2. As depicted in Figure 1 it comprises a central hub 19 about 2 inches in total over-all length, with its lower one-third reduced in diameter as shown at 37 and its entire outer surface provided with screw threads as shown; a channel 25 extends centrally throughout the length of hub 19, the lower end of channel 25 being intersected by a cross channel 38, the outer ports of which register with corresponding circular openings 38' and 38" in the central sides of bar 42'—all as shown in Figure 5.

The following members are attached to hub 19: First lock washer 44 is slipped over the lower end of the reduced section 37 of hub 19, then circular member 40 is screwed onto end 37 until split lock washer 44 firmly engages the shoulder of the reduced hub, as shown at 44 in Figure 1. Thereafter a circular disc of heavy perforated metal like that depicted at 15 in Figure 4, having a central opening 39' large enough to fit snugly around hub end 37, is slipped over the said end and held there until circular member 42 is screwed in place, upwardly on hub 19, until it engages and presses the peripheral sections of disc 15 against the circular supporting ring 40 and its cross-bar 40' (see Figures 1 and 3). The central part of the bar 42' of member 42 is tapped with a screw thread partway through the bar as shown at 39 in Figures 1 and 5. The untapped portion of bar 42' closes the lower end of channel 25 as shown; but liquid slurry flowing down channel 25 under forcing impulses of a circulating pump, exits from hub 19 through cross-channel 38, and ports 38' and 38", and bathes the lower surface of the perforated disc 15 which serves as the working and cutting tool end 15 in this tool.

Member 42 is tightened by screw motion until its bar abuts disc 15 and is in alignment with cross-bar 40' of member 40, whereby perforated die disc 15 is seated securely at its peripheral points against supporting ring member 40, all as shown at 15 in Figure 1. The assembly of the tool is completed now by screwing circular plate member 41 (Figures 1 and 2) downwardly over the upper end of hub 19 to about the position of 41 shown in Figure 1. 41 is provided near its periphery with four threaded bolts 43 spaced 90° apart, by which a downward thrust upon and support of circular ring 40 is effected when each bolt is screwed downwardly until it is lodged in a corresponding depression 43' (Figure 3) in ring member 40 and as shown in Figure 1.

Assuming that a suitably formed and dimensioned tool holder carrying the transistor cutting tool has been attached to the anti-node oscillating end of a suitable transducer producing impulses of low amplitude but of a frequency of about 27,000 cycles per second; then cutting face 15 of the tool end will be at an anti-node point; and when the transducer has been actuated by appropriate electrical energy, tool face 15 will oscillate at high frequency and low amplitude and will have an acceleration something like 60,000 times that caused by the force of gravity. The transducer unit and a slurry pump is then set in operation causing the liquid slurry to flow copiously out of channel ports 38' and 38" and to bathe all exposed surfaces of slice 32 therewith. The outlet of the dish-like pan of the work table—in which the work is mounted—being above the level of the mounted slice 32, it will be totally immersed in the slurry during the cutting operation.

The tool face 15 is then brought into near contact with the upper surface of slice 32 and under regulated, applied pressure it will be noted that tool face 15 gradually sinks into and through slice 32. A gauge indicates when the tool face has penetrated entirely through slice 32 and a slight distance into glass base plate 33. The tool is then withdrawn, without cessation of the oscillation, when it will be found that each perforation of the tool face 15 has incised and extruded a slab of germanium having the dimensions of the perforation, which slabs—about 80 in number with a slice 5/8" in diameter—remain for the most part affixed to underlying upstanding prongs of glass each of which is attached at its lower end to the unpenetrated portion of glass base plate 33.

The entire mounting base assembly depicted in Figure 1 may then be removed from the dish-like container, and immersed in a suitable solvent for the cement used to affix 32 to 33 and 33 to base blocks 34, elevating the temperature somewhat if necessary to soften the cement. It is preferable to use a different type of cement to secure blocks 34 and plates 36 and 35 together, a type which will remain adherent under the softening treatment. Any transistor slabs which become detached from glass plate 33 during the tool withdrawing operation will remain lying above the upper face of the perforated disc 15, and are later removed, by flushing with water.

Referring now to Figures 8 to 14 there is shown (in Figures 8–10 and 15) an inverted, cup-like, member 50 for supporting a bundle 51 of alternative spaced cutting blades 52 and spacers 53 (Figures 11 and 12). A channeled stud member or hub 49 is threaded exteriorly and is inserted into supporting member 50 at its central point, as shown in Figures 9 and 10. The web 50 and shoulders 50' of the supporting member may, of course, be cast or turned on a lathe either from a light metal, such as an aluminum alloy, or from plastic. Its purpose is to provide a suitable holder or positioner for the bundle 51 of cutting blades and spacers and for their connection through stud 49 with the tool holder 87 (Fig. 15) of a transducer 86 (Fig. 15). The bundle 51 of cutters and intervening spacers is made up from a suitable number (eight in the illustration) of suitably formed pieces 52 and 53 of sheet metal (Figures 11 and 12) which provide cutter blades and spacers, alternatively arranged and held in close contact between themselves and in proper alignment, by a threaded bolt 54 which may be, as shown, composed of two portions, 54' and 54", the latter provided with a cap 55' brazed or otherwise affixed to its end and interiorly threaded as shown so as to engage and screw onto the right end of section 54'; and thus to urge together the two end pieces 56 and 57 which serve to clamp the bundle 51 of sheet materials closely together and to hold it in its proper position for cutting—similarly, it might be said, to the two supporting plates or clamps of a safety-razor holder.

This clamping and positioning action of end pieces 56 and 57 is attained by the compression afforded thereby when the two pieces are urged toward one another and closer together between nut 58 and cap 55, when bolt section 54" is screwed as far as possible into supporting member 50, as by means of a screw driver inserted into the screw slot 59 (Figure 8), bolt section 54' being held immovable meanwhile as by the clamping and affixing action of nut 60" and its lock washer 60'. Nut 58 at the left end of the bundle of cutter leaves is held in place immovably by its lock washer 58' (Figure 8).

The left hand portion 56 of the bundle clamp is in slotted, loose engagement with the left hand portion 54' of bolt 54 so that its position thereon can be suitably adjusted; but, laterally, at each side of 56 there is immovably affixed one of the two prongs 60 and 61, which are provided to help in assembling the bundle of cutter leaves and their spacers, and to maintain them in position when assembled and during use. These prongs 60 and 61 may be brazed into clamp 56 or affixed thereto by any other means which will hold them rigidly in alignment; but they support no considerable strain during use of the tool, serving mainly to align the cutter blades and spacers in place during assembly of the cutter bundle.

In assembly of the said bundle, left hand section 54' of the bundle supporting bolt 54 is or may be supported in a vertical position while disengaged from right hand section 54" and cap 55. Cutter blades 52 and 53 are then slipped alternately over the prongs 60 and 61 of the clamp 56 by inserting the prongs 60 and 61 into the eyelet openings 62 and 62' of cutter blades 52 and slotted eyelets 63 and 63' of spacers 53. Bolt 54 will also be spanned and embraced by the cut-out portions 64 and 65 of the bundle leaves 52 and 53. In assembling the bundle, initially, for cutting operaiton, the prongs 60 and 61 so penetrate slotted eyelets 63 and 63' that the prongs 60 contact the lower edges of 63 and 63' as shown in Figure 10. The result is that cutter blades 52 and spacers 53 are staggered in their relative vertical positions, so that a bundle is formed like that depicted at 51 in Figure 9, wherein the lower edges of cutter blades 52 project downwardly beyond the lower edges of spacers 53, thus forming a series of open cutter blades as shown in Figure 9.

Having thus assembled the bundle of alternating cutter and spacer leaves on the left end of bolt 54, then the right-hand end section 54" and its cap 55 is connected to left-hand end 54' and the bundle is compressed by screwing cap 55 onto the extreme right end of 54' until it presses loosely against end clamp section 57. Since 57 slidably engages bolt 54 it (57) is forced as far as it will slide toward end clamp section 56 at the opposite end of the cutting tool bundle 51, which clamp in turn is maintained immovable by the nut 58 and lock washer 58' (Figure 8).

Nuts 60'''' and 60'''' are now screwed out nearly to the ends of bolt sections 54' and 54", and the bolt and its assembled cutting bundle 51 is inserted into the slotted portions 70 and 71 of shoulders 50' of supporting member 50, i. e., into the position shown in Figure 9; the cap 55 of the bolt should be only loosely screwed onto the end 54' of bolt 54 during this seating of the cutter bundle; and the support member 54 should remain inverted, all to the end that spacers 53 may be free to fall, or be pushed into positions where each spacer 53 contacts the lower edges of its slots 63 and 63' with prongs 60 and 61, as illustrated in Figure 10. When this has been effected, then cap 55 is screwed firmly onto the right-hand end of the bolt section 54' so as to compress firmly all of the spacers 53 and cutter blades 52 into a tight bundle 51, as illustrated in Figures 8 and 9. The bolt and assembled cutter bundle will then take the position shown (but still inverted therefrom to be sure) in Figure 9, wherein, it will be noted, the upper ends of spacers 52 are in contact with the inner and lower surface of supporting member 50. The cutter blades 52, however, will, because they are immovably positioned by eyelets 62 and 62' and by prongs 60 and 61 inserted therein, be positioned—also as shown in Figure 9—so that they are staggered vertically with respect to spacers 53 and so that the lower ends 52 of cutter blades project outwardly beyond the lower ends 63" of spacers 53—as is clearly evident in Figures 9 and 10.

When the bolt sections 54' and 54" are thus firmly seated in place, as described, then nuts 60'''' and 60'''' at their ends are screwed tightly aganist the adjacent flat, narrow sides 70 and 71 of supporting member 50 and the intervening lock washers, i. e., into positions shown in Figure 9, which shows the entire tool in its inverted assembled and final position. All the nuts 60'''', 60'''' and 58 and the cap 55 should be tightly screwed against their adjacent tool elements at this time, so that the tool will be securely positioned and so that when inverted and in its operative position it will be as shown in Figure 9.

Two screws 66 and 67, which are threaded into supporting member 50, one at each side of stud 49 (see Figure 9), should be adjusted at this time to about the positions shown in Figure 9, i. e., each projecting far enough into the space 68, as shown, that end clamps 56 and 57 contact the ends of screws 66 and 67, when the cutting bundle 51 and the bolt 54, which carries it, is inserted into space 68 far enough to cause contact between the upper ends of spacers 53 and the inside of supporting member 50. By this provision both sections of bolt 54 and of end clamps 56 and 57 mounted thereon will be effectually prevented from any movement upwardly during use of the tool and thus prevent any similar movement, and consequent displacement of cutter blades 52 during the downward thrust thereof against work slice 69 during subsequent vibratory abrasion and cutting thereof.

At this time the short screws 72 and 73 (Figures 8 and 15) are to be unscrewed or removed entirely from supporting member 50. The tubular element 74 is then shoved into the member 50 and with these two elements in such relative positions that the cut-away slotted portions 75 and 75' surround and embrace the adjacent portions of bolts 54' and 54", and so that the threaded screw holes 76 and 76' are in alignment with the threaded shanks of screws 72 and 73 as in Figures 8 and 10. Thereupon screws 72 and 73 are screwed into tubular member 74— as shown in Figures 8 and 10—thus providing, by this expedient, a casing member for the tool, which, when it is reversed into its operating position, will have the appearance of Figures 9, 10 and 15.

At this time the completely assembled tool, after having been reversed, will then be secured to the tool holder of the transducer 87 and 86 (Fig. 15) as by screwing channeled stud member 49 into a threaded hole suitably provided at the end of the tool holder. This should be at a node of the vibratory unit and the dimensions of the tool should be so proportioned, having in view its acoustic characteristics, that the blade cutting ends of 52 will be at anti-nodes, and thus at the point of maximum vibration. That is the dimension of the tool from the upper end of stud 49 to the lower edge of cutting blades 52 should be substantially or an even multiple of ¼th wave length of the material of the tool blades and tool holder; assuming these are constructed of brass, and that the upper end of the tool holder is attached, as it should be, to an anti-node of the transducer, then the length of the tool holder should be ¾ of 18 cm., i. e., 13.5 cm., and the overall length of the tool itself from upper edge of stud member 49 to the lower edge of cutting blades 52 should be ¼ of 10 cm., or 4.5 cm. If the stud 49 and blades 52 are brass, the material of supporting member 50, of tubular member 74 and of bolt 54 can be any suitably lighter and machinable material, such as an aluminum alloy or plastic, for the propagation of acoustic wave energy will be entirely through the brass elements 49 and 52.

In use, the transducer, tool holder and tool, all securely connected together so as not to loosen by the energetic vibratory oscillations at say 27,000 cycles per second, are lowered into cutting position, initially close to but not in actual contact with the upper surface of the semiconductor slide 69, i. e., in the position shown in Figures 9 and 10. The slice itself or the ingot or crystal (69', Fig. 15) to be sliced initially should be mounted on a suitable firm base 77, say of glass, and be affixed firmly to its immediate supporting base by a suitable adhesive material such as shellac, as indicated at 78 in Figures 9 and 10. A slurry of comminuted abrasive, such as boron carbide, suspended in water containing suitable additive agents such as those disclosed in my co-pending U. S. patent application Serial No. 371,408 (Patent No. 2,736,148), and will then be caused to flow over and under the tool blades 52, being supplied to the tool through the channel 79 in the stud 49 and flowing thence over the exterior surfaces of tool blades 52 through the narrow channels 80 (Figures 9, 10 and 15) between the separated spacers 53, and thence downwardly over the sides of the tool bundle in the spaces 68. The slurry can and will be maintained in the supporting pan 92, Fig. 15, of the cutting device at about the level indicated by the lines A—A in Figures 9, 10 and 15, as determined by the height of the outflow spout of the pan at that level.

The result will be that the work, to be incised into slices or into pellets for transistors, will at all times be immersed in liquid, efficiently cutting, abrasive slurry. By moving the cutting tool steadily downward during the operation the vibratory movements of the tool blades 52, and consequently of the abrasive particles, the ingot 69' or slice of hard brittle materials, such as germanium, becomes speedily furrowed and sliced vertically into narrow, parallel strips, such as those shown at 81 in Figure 13. Under the conditions hereinabove disclosed the slice 69 will be furrowed through to the glass base 77' within several seconds, and each strip 82 will remain in parallel, equally spaced position as shown in Figure 13, being retained in those positions by the cementing adhesive layer of shellac 78.

Thereupon either the device and its cutting tool or the mounted slice of the work are revolved 90°, so that the tool and mounted slice take the relative positions shown in Figure 10. But before this is done the cutting edges 52 of the tool are extracted from the furrows they have incised between strips 81, by moving the tool and the slice away from one another, which should be done while high frequency vibratory movement of the transducer continues.

The tool and work slices being then in the relative positions indicated by 52 and 82 in Fig. 10 or of 52 and 69' in Fig. 15, the cutting device, constantly bathed in flowing slurry as previously described, is again advanced slowly against the slice until it has penetrated through it to its mounting base 77'. The result will be the formation of the evenly spaced and shaped slices 82 of Fig. 13 or 69' of Fig. 15 or the diced slabs 84 shown in Fig. 14, each of which will remain in position attached to the common base 77' of glass, etc. The size, number and shape of the completed slabs 84, shown in Fig. 14, or of the slices 81 or 82 of Fig. 13 and 69' of Fig. 15 is only illustrative; they can be varied in number and be made more narrow or wider, and also longer, so as to constitute flat pellets, merely by varying the thickness or number of the spacers 53 between successive cutting blades.

This ready and facile mass-production of uniformly dimensioned slices of quartz or semi-conductors, or of transistor slabs, regulation of the size of the pellets, and also the ready and facile replacement of worn cutting blades, together with the inexpensiveness of the material of the tool, renders it superior and of unequalled excellence for its designated purpose. It will be found to provide outstanding economies and to greatly speed up the rate of mass-production of transistors. The pellets thus produced may, of course, be shaped and dimensioned suitably to provide the raw material for manufacture of quartz slices or for surface-contact transistors by the Philco process; and transistor slices only .005" thick, such as are used by some companies, such as RCA, for making junction transistors, can be mass-produced hereby from ingots of semi conductors with unvarying, uniform dimensions by using .005" thick cold rolled steel, strip shim material to make spacers 53.

The operation of withdrawing cutter blades 52 from furrows such as either 81 of Figure 13 of those of Figure 14 can perhaps be better accomplished by maintaining the cutting tool in its final lowermost position at the end of any cut, and by pushing upwardly, at that time, the exposed ends 85 and 85' of the bolt 54, after having loosened the nuts 60'''' and 60'''' and cap 55 thereon. This expedient permits this bolt to move upwardly in the slotted portions 70 and 71 of the shoulders 50' of supporting member 50 (see Figure 9). This upward movement of 54 will carry with it similar and simultaneous movements of cutter blades 52 by virtue of the engagement of eyelets 62 and 62' with the prongs 60 and 61 which will move upward in step with bolt 54, since it and the two prongs are anchored in unchangeable alignment in end clamps 56 and 57. Impact of spacers 53 on the upper surfaces of slice 69 will prevent any dislodgment of the incised work piece, since the spacers 53 at their upper ends abut against the fixed, immovable inner, lower surface of the web 50 of supporting member. But the series of cutting blades 52 of the cutter tool bundle 51 can and will move upwardly, accompanied by withdrawal of the lower cutting ends of 52 from the incised furrows, such as 81 of Figure 13, whenever bolt 54 is moved upwardly, as just above described, until the upper edges of blades 52 in turn contact with the lower inside surface of the web of supporting member 50. This treatment will leave the incised, diced slice of semi-conductor completely disengaged from the cutter tool and yield multiple uniformly dimensioned transistor slabs, e. g., 84 of Figure 14, remaining in position attached to their common base 77', held there by the layer of shellac.

Finally, the scores of transistor pellets thus formed are removed, en masse, by dissolving the shellac or other adhesive used, as by flooding the base plate 77 and its adhering pellets in warm alcohol, to provide multiple individual, diced pellets suitable for finishing operations to make solid-state transistors of any type (of either point-contact, junction or surface-barrier type).

The shape and dimensions of these transistor blanks can be readily held in close tolerance to any desired dimension and shape, bounded by plane surfaces, which may be desired by different transistor manufacturers, merely by suitable regulation of the thickness of the spacer leaves 53. Diced transistor blanks of the size depicted at 84 in Fig. 14 may be larger than will ordinarily be desired; but that size was selected merely as not too small to be clearly visible and by way of illustration. The tool itself is proportioned, in the drawings of the patent, to approximately the dimensions it would actually have, i. e., one-quarter wave or 2.5 inches length from top to bottom, if it and the tool holder is constructed of steel, in which the wave length at 27,000 cycles is approximately 10 inches. However, the hub 49 should have agreater length than that shown in the printed patent drawings and should be sufficiently long to have one-quarter wave length of the metal of 49 and 52 from the upper extremity of 49 to the lower cutting edges of 52.

I claim:

1. A tool for mass-production of slices of semi-conductors for the manufacture of transistors, adapted simultaneously to cut uniformly dimensioned, multiple slices from ingots to brittle, semi-conductor work-pieces by impact of a supersonically vibrated tool end upon abrasive particles of a slurry film circulated between the tool end and work face, which comprises: a tool hub and body and clamping means for the tool cutting element, and tool di-patterns formed of sheet metal rigidly supported by said hub and body and by die-pattern clamping means against displacement during said supersonic vibratory movement of the tool end, and means for altering the pattern and replaceably clamping said sheet metal die patterns to said tool body, and means forceably to circulate a liquid abrasive slurry through the interior of said tool and back of and around said die patterns and between them and the confronting surfaces of the work-piece.

2. A tool for mass-production of slices of semi-conductors for the manufacture of transistors, adapted simultaneously to cut uniformly dimensioned, multiple slices from ingots of brittle, semi-conductor work-pieces by impact of a supersonically vibrated tool end upon abrasive particles of a slurry film circulated between the tool end and work face, which comprises: a tool hub and body and tool end die patterns formed of replaceable die-elements consisting of parallel lengths of metal supported against displacement during said vibratory movements of the tool end by means comprising removable screw members rigidly but adjustably positioned in supports intervening between said members and tool body, and designed to afford said adjustment, said screw members being offset from the longitudinal axis of said tool and adjustable as to their spaced relation thereto, and so as to alter the spacing of said die patterns and element, and means forceably to circulate a liquid abrasive slurry through the interior of said tool and back of and around said die patterns and between them and the confronting surfaces of the work-piece.

3. A tool for cutting multiple transistor elements of uniform dimensions from ingots of hard brittle semi-conductors, by high frequency impact abrasion which comprises a transducer adapted to be vibrated at a high frequency in combination with a tool body, a tool holder adapted to rigidly connect said transducer and tool body, and a tool end die pattern formed of leaves of sheet metal and spacing members rigidly supported by said tool body adjacent to the work face of said ingots and against displacement during said high frequency vibration, means for disconnecting said leaves of sheet metal from said tool body and for replaceably connecting said leaves to said body with intervening, altered spacing members for said leaves, and means forceably to circulate a liquid abrasive slurry through the interior of said tool and back of and around said die patterns and between them and the confronting surfaces of the work-piece.

4. A tool according to claim 3 wherein the means for disconnecting and replaceably reconnecting the tool end die-patterns from and to the tool body comprises replaceably clamping means comprising removable screw members threaded into a metal support member intervening between said tool body and said die patterns and screw member.

5. A tool for cutting multiple transistor elements of uniform dimensions from ingots of hard brittle semi-conductors, by high frequency impact abrasion which comprises a transducer adapted to be vibrated at a high frequency in combination with a tool body, a tool holder adapted to rigidly connect said transducer and tool body, and a tool end die pattern formed of leaves of sheet metal constituting cutting members and spacing members rigidly supported by said tool body adjacent to the work face of said ingots and against displacement during said high frequency vibration, and means for advancing the spacing members relatively to the cutting members so as to remove, intact, the transistor elements from said tool and from between said tool end die patterns, and means forceably to circulate a liquid abrasive slurry through the interior of said tool and back of and around said die patterns and between them and the confronting surfaces of the work-piece.

6. A tool according to claim 3 wherein the means for disconnecting and replaceably reconnecting the tool end die-patterns from and to the tool body comprises replaceably clamping means comprising removable screw members threaded into a metal support member intervening between said tool and said die patterns and screw member, and means for advancing the spacing members relatively to the cutting members so as to remove, intact, the transistor elements from said tool and from between said tool end die patterns.

7. A tool for mass-production of slices of semi-conductors and for the dicing of transistor pellets therefrom, adapted to slice uniformly dimensioned, multiple plates from ingots of brittle semi-conductor work-pieces and thereafter to dice said plates into transistor pellets, which comprises means to vibrate said tool at high frequency, in combination with a tool body a tool holder attached to said tool body and vibrating means, and a working tool face having die-patterns comprising spaced, parallel metal cutting elements, said elements being supported, in closely spaced relationship, by removable and adjustable screw members against displacement during vibration at said high frequency, said cutting elements having parallel cutting surfaces extending across said tool face, and means to forceably circulate a liquid abrasive slurry through the interior of said tool and back of and around said cutting elements and between said cutting surface and the confronting work piece.

8. A method for controllably varying, regulating and standardizing the dimensions of multiple transistor pellets in the mass-production, by ultrasonic impact abrasive cutting, of slices and dices of semi-conductors from ingots thereof, which comprises: vibrating a coupled transducer, tool holder, tool body and tool end die-pattern cutting elements at high frequency and low amplitude, holding said vibrating tool end in close proximity to the confronting work face of the semi-conductor, adjustably supporting the die-pattern cutting elements of the said tool end in closely spaced, uniform parallel rigid alignment upon removable, threaded screw members rigidly seated in said tool body, forceably circulating a liquid abrasive slurry about and around said cutting elements to remove the detritus of abrasion, and ejecting the said slices and dices intact from between said closely spaced cutting elements and from the tool.

References Cited in the file of this patent

UNITED STATES PATENTS

| 177,496 | Gafney | May 16, 1876 |
| 262,728 | Borton et al. | Aug. 15, 1882 |
| 806,951 | Brying | Dec. 12, 1905 |
| 966,719 | Thompson et al. | Aug. 9, 1910 |
| 1,966,446 | Hayes | July 17, 1934 |
| 2,124,273 | Larsson | July 19, 1938 |
| 2,452,211 | Rosenthal | Oct. 26, 1948 |
| 2,504,831 | Griss | Apr. 18, 1950 |

OTHER REFERENCES

The Machinist, pages 753–755 inc., May 1, 1954.